United States Patent [19]

Kohzai et al.

[11] 4,217,513
[45] Aug. 12, 1980

[54] DIRECT CURRENT MOTOR

[75] Inventors: Yoshinori Kohzai, Hino; Shigeaki Oyama, Hachioji, both of Japan

[73] Assignee: Fujitsu Fanuc Limited, Japan

[21] Appl. No.: 846,428

[22] Filed: Oct. 28, 1977

[30] Foreign Application Priority Data

Nov. 10, 1976 [JP] Japan .................. 51/150743[U]

[51] Int. Cl.² .............................................. H02K 1/10
[52] U.S. Cl. ..................................... 310/186; 310/52; 310/154; 310/181
[58] Field of Search ............... 310/177, 185, 186, 187, 310/188, 181, 154, 52, 53, 64, 65, 46, 190, 179, 223, 224, 61, 184; 322/64–66; 318/521–525

[56] References Cited

U.S. PATENT DOCUMENTS

| | | | |
|---|---|---|---|
| 1,739,137 | 12/1929 | Gay | 310/52 |
| 2,330,121 | 9/1943 | Heintz | 310/52 |
| 2,474,648 | 6/1949 | Binney | 310/187 |
| 3,214,620 | 10/1965 | Smith | 310/154 UX |
| 3,521,100 | 7/1970 | Tamm | 310/186 |
| 3,566,251 | 2/1971 | Hogund | 310/181 |
| 3,567,974 | 3/1971 | Spingler | 310/46 |
| 3,765,480 | 10/1973 | Fries | 165/86 |
| 3,862,445 | 1/1975 | Volkrodt | 310/154 |
| 3,984,711 | 10/1976 | Kordik | 310/154 |
| 4,011,479 | 3/1977 | Volkrodt | 310/186 |
| 4,041,338 | 8/1977 | Madsen | 310/186 |

*Primary Examiner*—R. Skudy
*Attorney, Agent, or Firm*—Staas & Halsey

[57] ABSTRACT

Disclosed is a direct current motor which comprises an armature, provided with armature windings thereon, and a plurality of field magnet devices, each of the field magnet devices being divided into three parts along the rotational direction of the armature. The parts are a main pole, which consists of a permanent magnet or an electromagnet activated by field windings wound thereon and which is disposed at a central portion of the field magnet device, and a pair of auxiliary poles, each of which consists of a permanent magnet. One of the auxiliary poles is disposed at one end of the main pole and the other auxiliary pole is disposed at the other end of the main pole. The permeability of the auxiliary poles is selected to be smaller than that of the main pole, and the polarity of the auxiliary poles is selected to be the same as that of the main pole.

Since the permeability of the auxiliary poles is small, magnetic flux generated by the armature current is very small at a position adjacent to each end of the field magnet devices and is substantially equal to zero at a central position adjacent to two field magnet devices (on the geometric neutral axis). Consequently, the displacement of the electrically neutral axis caused by the armature reaction can be prevented and, as a result, degradation of the commutating characteristics does not occur.

11 Claims, 7 Drawing Figures

DIRECT CURRENT MOTOR

BACKGROUND OF THE INVENTION

The present invention relates to a construction of a direct current motor, especially to a preferable construction of a direct current motor having a rotating speed which can be varied over a wide range.

As is well known in the art, armature windings of a direct current motor, which is disposed in the magnetic flux generated by field magnets, are supplied with electric current and, then, the armature is rotated by the cooperation of the armature current and the magnetic field. The direction of the current supplied to the armature is commutated in accordance with the rotation of the armature by utilizing a commutator and brushes.

When the armature of such a direct current motor is supplied with armature current, magnetic fields are generated around the armature by the armature current. The magnetic fields generated by the armature current have various influences on the magnetic flux generated by the field magnets, which are generally called armature reactions. Such armature reactions are, for example, (a) displacement of the electrically neutral axis, (b) decrease of the magnetic flux and (c) nonuniformity of voltage on the commutator and local high voltage on the commutator.

One of the armature reaction phenomena is that the magnetic flux generated by the armature current displaces the electrically neutral axis from the geometric neutral axis defined by the field magnets, as mentioned in item (a), above. When the electrically neutral axis is displaced, magnetic flux can exit on the geometric axis. When the above-mentioned magnetic flux is interlinked with the armature windings, voltage is induced in the armature windings. As a result, when a brush is disposed on the geometric neutral axis, the induced voltage is shorted and a spark is generated. As a result, a large electric current flows to the brush and commutation becomes difficult; in other words, the commutating characteristics are degraded.

To obviate the degradation of the commutating characteristics, an interpole is usually disposed at a position between two adjacent field magnets. However, in some cases, for example in a situation wherein the required characteristics of the motor do not permit leakage of magnetic flux through the interpole, it is difficult to dispose the interpole so as to obviate the degradation of the commutating characteristics.

SUMMARY OF THE INVENTION

An object of the present invention is to provide a direct current motor in which displacement of the electrically neutral axis from the geometric neutral axis can be prevented and in which degradation of the commutating characteristics can also be prevented.

Another object of the present invention is to provide a direct current motor which is almost free from degradation of the commutating characteristics without utilizing the above-mentioned interpole or with smaller interpoles if interpoles are required.

A further object of the present invention is to provide a direct current motor having a plurality of field magnet devices, each of which comprises a main pole and a pair of auxiliary poles consisting of a permanent magnet, which is relatively simple in construction and which can prevent degradation of the commutating characteristics.

Further features and advantages of the present invention will become apparent from the detailed description set forth below with reference to the accompanying drawings.

BRIEF DESCRIPTION OF THE DRAWINGS

FIG. 1 (b) is a diagram which is used for explaining the displacement of the electrically neutral axis from the geometric neutral axis, and which shows relationships between positions along the rotational direction of the armature and the magnetic flux generated by magnetic fields and the armature windings shown in FIG. 1 (a);

FIG. 2 (b) is a diagram which shows relationships between positions along the rotational direction of the armature and the magnetic flux generated by magnetic fields and the armature windings;

DETAILED DESCRIPTION OF THE INVENTION

[Prior Art]

The phenomenon that the electrically neutral axis is displaced from the geometric axis in conventional direct current motors and that the commutating characteristics are degraded is explained hereinafter with reference to FIG. 1.

Figure 1A:
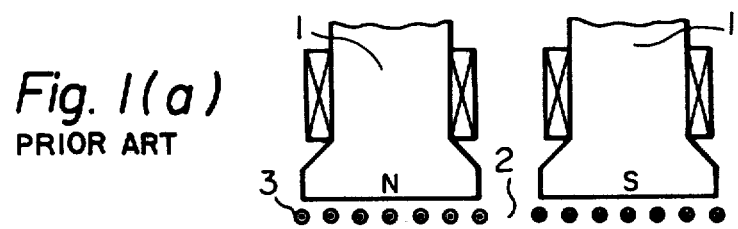
FIG. 1 (a) is a view which shows the field magnets and armature windings in a conventional direct current motor.
Figure 1B:
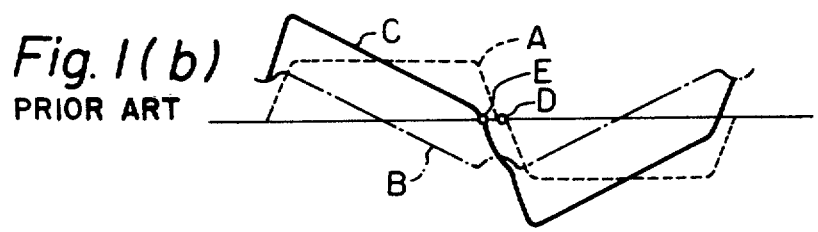

The conventional direct current motor has field magnets 1 as shown in FIG. 1 (a). When an armature is not loaded, in other words, when an armature current is not flowing in armature windings 3, magnetic flux generated by the field magnets is uniformly distributed along the lengthwise direction of the field magnets 1 as shown by a broken line A in FIG. 1 (b).

From a theoretical standpoint, the magnetic flux generated only by armature current flowing in the armature windings 3 (FIG. 1 (a)) has, when plotted on a graph with the amount of the magnetic flux as the ordinate and position as the abscissa, an inclined line which is zero at the center of the field magnet 1, and has a maximum value at the center of the clearance 2 caused by two adjacent field magnets. In actual use, since the clearance 2 has a large magnetic resistance, the distribution of the magnetic flux generated by armature current has a maximum value at a point adjacent to the end of the field magnet, as shown by a dot-dash line B in FIG. 1 (b). As a result, when the armature windings 3 are supplied with armature current, the magnetic flux (shown by the broken line A) generated by the field magnets and the magnetic flux (shown by the dot-dash line B) generated by the armature current interfere with each other. As a result, a deformed distribution curve of the magnetic flux, as shown by a solid line C, can be obtained.

When the distribution curve of the magnetic flux is deformed as shown by the solid line C, the electrically neutral axis E is simultaneously displaced from the geometric neutral axis D defined as a center of the two adjacent field magnets along a lengthwise direction of the field magnet 1. As a result, a voltage is induced by the magnetic flux in the armature windings 3 positioned at the geometric neutral axis E. When a brush for contact with a commutator is disposed at the geometric neutral axis, the induced voltage is shorted between the commutator and the brush and an arc is generated. Consequently, degradation of the commutating characteristic is caused.

To obviate or to reduce the above-mentioned degradation of the commutating characteristics, an interpole (not shown) is usually disposed at a position between the field magnets 1 so that the distribution of magnetic flux is improved. However, if only an interpole is utilized to prevent displacement of the electrically neutral axis, a very strong magnetic flux must be generated by the interpole so as to obviate the magnetic flux generated by the armature current. To this end, the volume of the interpole, especially the cross sectional area thereof, is often increased. However, the magnetic flux generated by the field magnets may be leaked through an interpole having a large cross sectional area. The leakage of the magnetic flux causes a degradation of the performance of the direct current motor. In addition, an interpole having lead lines connected thereto may make the direct current motor complicated in construction.

Another known method to obviate the above-mentioned degradation of the commutating characteristic is to arrange a field magnet and an armature so that the clearance between the field magnet and the armature is wide at each end of the field magnet and is narrow at the center of the field magnet. However, this method is not sufficient to compensate for the above-mentioned displacement of the electrically neutral axis. On the other hand, since this method substantially increases the clearance between the field magnet and the armature, the magnetic flux interlinking the armature windings may be decreased, which causes the performance of the direct current motor to be degraded.

[Principle of the Present Invention]

The principle of the present invention will now be explained with reference to FIG. 2.

Figure 2A:
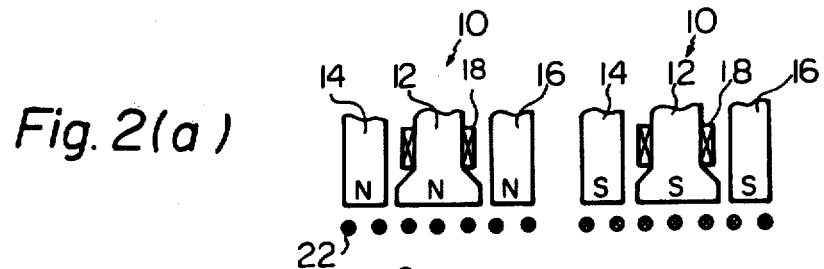
FIG. 2 (a) is a view illustrating armature windings and two field magnet devices having main poles which are activated by field windings.
Figure 2B:
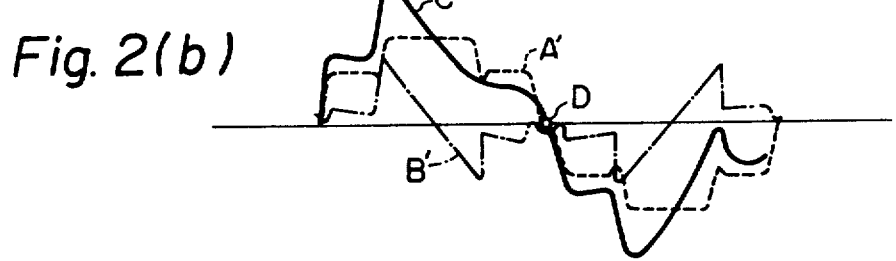

Referring to FIG. 2 (a), each of two adjacent field magnet devices 10 comprises three parts, disposed along a rotational direction of an armature (in FIG. 2 (a), only armature windings 22 wound around the armature are shown). Each field magnet device 10 consists of auxiliary poles 14 and 16, along with main pole 16 centrally disposed between them. The main pole 12 comprises laminated magnetic core materials, such as silicon steel sheets, which have field windings 18 wound thereon so that the main pole 12 can be electromagnetically motivated.

Figure 3:
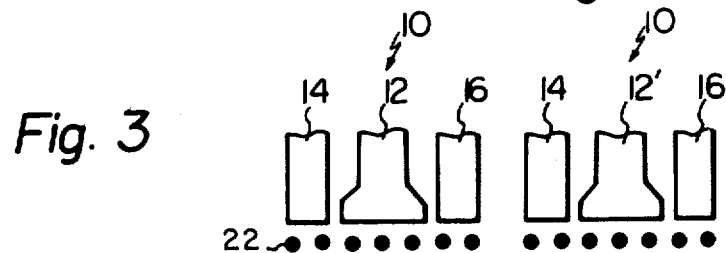
FIG. 3 is a view which shows another embodiment of the field magnet devices used in the present invention.

In another case, as shown in FIG. 3, the main pole 12' can be made of a permanent magnetic material, such as of Alnico, Alcomax, or Oerstit. In this case, field windings 18 (FIG. 2 (a)) can be omitted. Each auxiliary pole 14 or 16 comprises a permanent magnet made of a ceramic material, such as Ferrite, which magnet has a smaller magnetic permeability ($\mu$) than that of the main pole 12 or 12' and which magnet has a large demagnetizing force (Hc). The polarity of each auxiliary pole 14 or 16 is selected to be the same as that of the main pole 12 or 12'. The distribution curve of the magnetic flux generated by the field magnet device 10 shown in FIGS. 2 (a) and 3 will now be explained with reference to FIG. 2 (b).

When the armature (not shown) is not loaded, in other words, when an armature current is not flowing in the armature windings 22 (FIG. 2 (a)), each magnetic flux generated by each of the main poles 12 or 12' and the auxiliary poles 14 and 16 is uniformly distributed along the lengthwise direction of each pole as shown by a broken line A' in FIG. 2 (b). The distribution curve of the magnetic flux generated only by an armature current flowing in the armature windings 22 is shown by an inclined line which is zero at the center of the main pole 12. It should be noted that the magnetic permiability ($\mu$) of each auxiliary pole 14 or 16 is smaller than that of the main pole 12 or 12', as mentioned above, so that the magnetic flux generated by the armature current is prevented from permeating into the auxiliary pole 14 or 16. As a result, the distribution of the magnetic flux generated by the armature current can be illustrated as shown by a dot-dash line B' in FIG. 2 (b) which has a zero value at a position adjacent to the center D of the two adjacent field magnet devices 10.

When the armature windings 22 are supplied with an armature current, the distribution curve of the magnetic flux shown by a solid line C' is obtained as a resultant of the magnetic flux (the broken line A') generated by the main pole 12 (FIG. 2 (a)) or 12' (FIG. 3) and the magnetic flux (the dot-dash line B') generated by the armature current. The distribution curve of the magnetic flux has a zero value at a position adjacent to the geometric neutral axis, owing to the reaction of the auxiliary poles 14 and 16. Consequently, the electrically neutral axis of the direct current motor according to the present invention can be very near the geometric neutral axis and, as a result, the degradation of the commutating characteristics can be prevented.

[Embodiment of the Invention]

Figure 4:
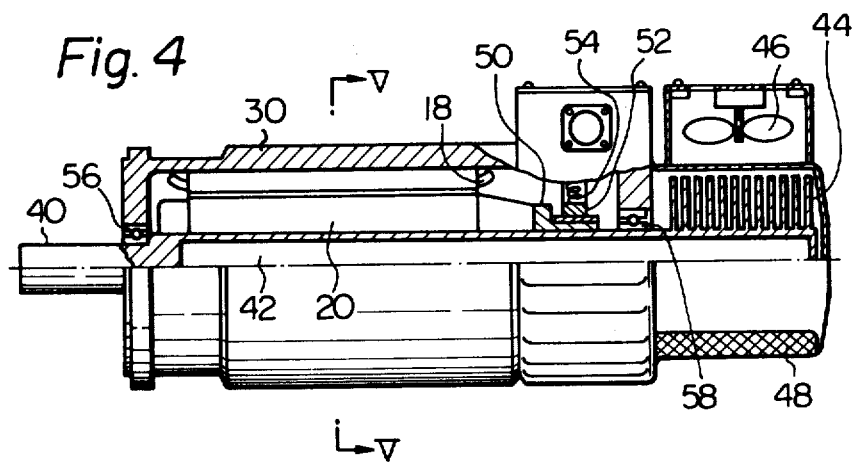
FIG. 4 is a partial sectional view of a direct current motor according to the present invention.
Figure 5:
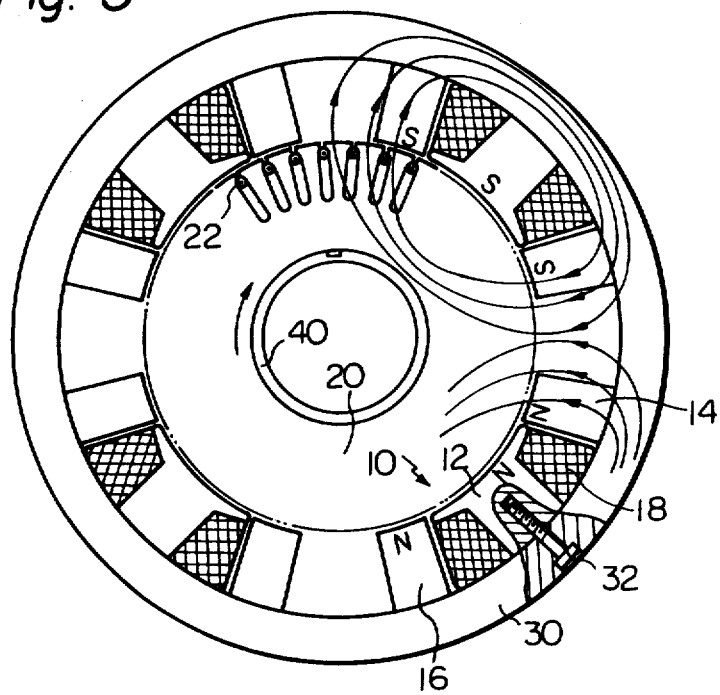
FIG. 5 is a cross sectional view along line V—V in FIG. 4.

A four pole direct current motor according to the present invention will now be explained with reference to FIGS. 4 and 5. Referring to FIG. 5, a main pole 12 comprising laminated silicon steel sheets is secured to a yoke 30 by means of a screw bolt 32. A pair of auxiliary poles 14 and 16, each of which is made of ferrite having a smaller magnetic permeability ($\mu$) than that of the main pole 12 and having a large demagnetizing force (Hc), is fixed to the yoke 30 by means of an adhesive at a position adjacent to each end of the main pole 12. Field windings 18 wound around the main pole 12 are formed in spaces between the main pole 12 and the auxiliary poles. Referring to FIG. 4, an armature 20 is fixed to a rotating shaft 40 rotatably supported by bearings 56 and 58 and has armature windings 22 (FIG. 5) wound thereon. The armature windings 22 (FIG. 5) are connected to a commutator 50 (FIG. 4) disposed on the rotating shaft 40. Referring again to FIG. 4, a brush 52 disposed at a position adjacent to the electrically neutral axis is urged toward the commutator 50 by means of a spring 54. The rotating shaft 40 is hollow. The pressure of the inside of the hollow portion 42 of the rotating shaft 40 is reduced and a small amount of water is inserted into the hollow portion 42. Then, the rotating shaft 40 is constructed as a heat pipe. Radiating fins 44 are fixed to the rear end of the rotating shaft 40. As a result, heat generated by the armature 20 is transmitted through the heat pipe constructed by the hollow portion 42 of the rotating shaft 40 to the radiating fins 44 where it is radiated into the atmosphere. A cooling fan 46 and an inlet port 48 are disposed so that they face the radiating fins 44.

What we claim is:

1. A direct current motor provided with an armature and a plurality of field magnet devices disposed around said armature and spaced apart from said armature, wherein each of said field magnet devices comprises:
   a main pole having a predetermined polarity; and
   a pair of auxiliary poles made of permanent magnets, one of said auxiliary poles being disposed at a position adjacent to one end of said main pole and the other of said auxiliary poles being disposed at a position adjacent to the other end of said main pole, the polarity of each auxiliary pole being the same as that of said main pole and the permeability of each auxiliary pole being smaller than that of said main pole.

2. A direct current motor according to claim 1, wherein said main pole consists of an electromagnet.

3. A direct current motor according to claim 1, wherein said main pole consists of a permanent magnet.

4. A direct current motor, comprising:
   a shaft;
   an armature mounted on said shaft; and
   a plurality of field magnet devices disposed around said armature and spaced apart from said armature, each of said field magnet devices comprising a main pole and means for reducing the magnetic flux existing at central positions between adjacent field magnet devices, said means including two permanent magnet auxiliary poles corresponding to said main pole and having smaller permeability than said corresponding main pole, said main pole being mounted between said two corresponding auxiliary poles.

5. A direct current motor as in claim 4, wherein each of said auxiliary poles has the same polarity as said corresponding main pole.

6. A direct current motor as in claim 5, wherein each of said auxiliary poles is made from ceramic material.

7. A direct current motor as in claim 6, wherein said shaft is a heat pipe.

8. A direct current motor as in claim 7, further comprising radiating fins affixed to said heat pipe.

9. A direct current motor as in claim 8, further comprising a fan directed to said radiating fins.

10. A direct current motor as in claim 7, wherein each of said main poles is a permanent magnet.

11. A direct current motor as in claim 7, wherein each of said main poles is an electromagnet.

* * * * *